United States Patent
Morales (10) Patent No.: US 10,402,126 B1
(45) Date of Patent: Sep. 3, 2019

(54) PRINT CONFIGURATION ENHANCEMENTS FOR ORDER WORKFLOWS

(71) Applicant: Kyocera Document Solutions Development America, Inc., Concord, CA (US)

(72) Inventor: Javier A. Morales, Irondequoit, NY (US)

(73) Assignee: Kyocera Document Solutions Development America, Inc., Concord, CA (US)

( * ) Notice: Subject to any disclaimer, the term of this patent is extended or adjusted under 35 U.S.C. 154(b) by 0 days.

(21) Appl. No.: 16/050,911

(22) Filed: Jul. 31, 2018

(51) Int. Cl.
*H04N 1/04* (2006.01)
*G06F 3/12* (2006.01)

(52) U.S. Cl.
CPC .......... *G06F 3/1205* (2013.01); *G06F 3/1275* (2013.01); *G06F 3/1288* (2013.01)

(58) Field of Classification Search
CPC ..... G06F 3/1205; G06F 3/1288; G06F 3/1275
USPC ........................................................ 358/1.15
See application file for complete search history.

(56) References Cited

U.S. PATENT DOCUMENTS

| | | | |
|---|---|---|---|
| 9,729,759 B1 | 8/2017 | Robinson et al. | |
| 9,747,066 B2* | 8/2017 | Liebelt | G06F 3/1203 |
| 2012/0081737 A1* | 4/2012 | Pandit | G06F 3/1205 |
| | | | 358/1.15 |
| 2012/0218590 A1* | 8/2012 | Dumitrescu | G06F 3/1205 |
| | | | 358/1.15 |

OTHER PUBLICATIONS

"Expanding Print's Horizons: Expanded gamut printing opens up new possibilities," Printing News, Feb. 1, 2016, retrieved from https://www.printingnews.com/digital-inkjet/digital-toner/article/12157848/expanding-prints-horizons, 4 pages.

* cited by examiner

*Primary Examiner* — Houshang Safaipour
(74) *Attorney, Agent, or Firm* — Sheridan Ross P.C.

(57) ABSTRACT

According to one embodiment, a method for configuring a print job in a print shop workflow can comprise defining, by a print job processing system of the print shop, one or more available print configurations for the print shop and one or more recommendation rules for applying the available print configurations. A file for a print job submitted to the print shop can be received and evaluated based on the defined one or more available print configurations and the defined one or more rules. One or more recommendations for configuring the submitted print job can be generated based on the evaluating of the received file. The submitted print job can be processed according to one of the generated recommendations and the print shop workflow.

20 Claims, 7 Drawing Sheets

PRINT CONFIGURATION ENHANCEMENTS FOR ORDER WORKFLOWS

FIELD OF THE DISCLOSURE

Embodiments of the present disclosure relate generally to methods and systems for custom printing of documents and more particularly to configuration of a print job in a print shop workflow.

BACKGROUND

Print shops provide custom printing of documents for customers with a wide range of available colors, finishes, and other products. Customers can readily see the difference between standard and value-added print products when the value-added print products include enhancements such as gloss, glitter, pearlescence, metallic inks, fluorescent inks, etc. However, customers cannot discern the benefits or drawbacks of using a specific print technology for a given job. For example, the increased vividness and color reproduction accuracy of extended gamut printing vs CMYK (Cyan, Magenta, Yellow, and Key(black)) printing is not easily conveyed to a customer when not every job will benefit from extended gamut printing.

Similarly, it is not easy to convey to a customer the acceptable quality of using either extended gamut printing or Process Spot color printing, such as CMYK+Pantone195 or CM+Pantone385, for example, when not every spot color can be accurately reproduced using extended gamut printing. For these reasons, print shops struggle to sell the most optimal print technology to their customers. As such, there is a need for improved methods and systems for selecting print configurations in a print shop according to quality, cost, and other factors.

BRIEF SUMMARY

According to one embodiment, a method for configuring a print job in a print shop workflow can comprise defining, by a print job processing system of the print shop, one or more available print configurations for the print shop and one or more recommendation rules for applying the available print configurations. A file for a print job submitted to the print shop can be received and evaluated based on the defined one or more available print configurations and the defined one or more rules. One or more recommendations for configuring the submitted print job can be generated based on the evaluating of the received file. The submitted print job can be processed according to one of the generated recommendations and the print shop workflow.

According to another embodiment, a system can comprise a processor and a memory coupled with and readable by the processor. The memory can store therein a set of instructions which, when executed by the processor, can cause the processor to configure a print job in a print shop workflow by defining one or more available print configurations for the print shop and one or more recommendation rules for applying the available print configurations. A file for a print job submitted to the print shop can be received and evaluated based on the defined one or more available print configurations and the defined one or more rules. One or more recommendations for configuring the submitted print job can be generated based on the evaluating of the received file. The submitted print job can be processed according to one of the generated recommendations and the print shop workflow.

According to yet another embodiment, a non-transitory, computer-readable medium can comprise a set of instructions stored therein which, when executed by a processor, causes the processor to configure a print job in a print shop workflow by defining one or more available print configurations for the print shop and one or more recommendation rules for applying the available print configurations. A file for a print job submitted to the print shop can be received and evaluated based on the defined one or more available print configurations and the defined one or more rules. One or more recommendations for configuring the submitted print job can be generated based on the evaluating of the received file. The submitted print job can be processed according to one of the generated recommendations and the print shop workflow.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
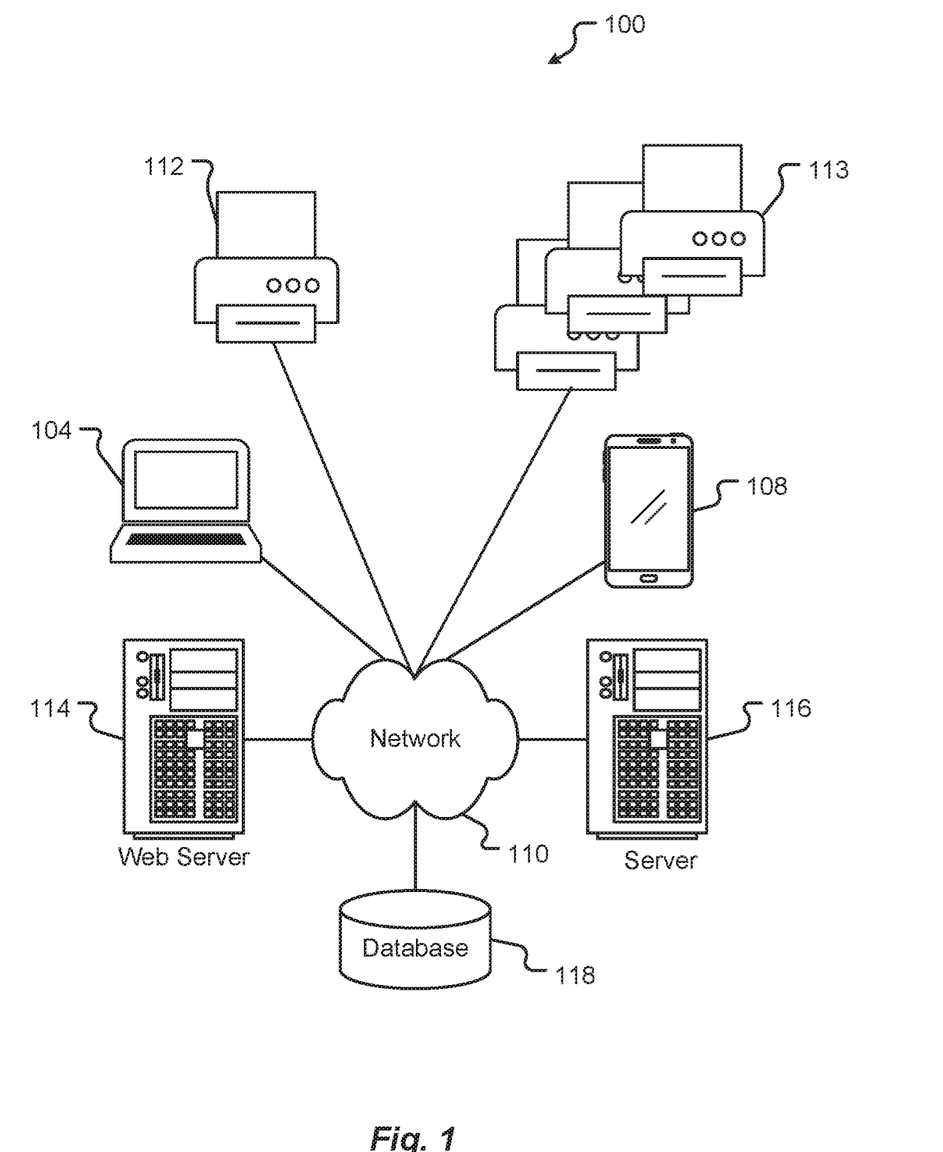
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices 104, 108, and 112, such as a computing device 104, a mobile device 108, a Multi-Function Printer (MFP) 112 and/or a digital press. The computing devices, such as computing device 104, may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. The computing devices 104, 108, and 112 may also have any of a variety of applications, including for example, database client and/or server applications, and web browser applications. Additionally, or alternatively, the computing devices, such as mobile device 108 may be any other electronic device, such as a thin-client computer, Internet-enabled mobile telephone, and/or personal digital assistant, capable of communicating via a network 110 and/or displaying and navigating web pages or other types of electronic documents. MFP 112 can comprise any of a variety of devices offering printing, scanning, copying, faxing, and/or other functions of processing documents. Examples of such devices can include, but are not limited to, the ECOSYS line of MFPs provided by KYOCERA Document Solutions Inc. Print shop 113 can comprise any of a variety of one or more devices offering printing on a variety of substrates and/or other functions of processing documents. Although the exemplary computer environment 100 is shown with two computing devices, any number of user computers or computing devices may be supported.

Environment 100 further includes a network 110. The network 110 can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish available operations as one or more web services.

The environment 100 may also include one or more file and/or application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server(s) 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 114 and/or 116 may also include database servers, including without limitation those commercially available from Oracle®, Microsoft®, Sybase®, IBM® and the like, which can process requests from database clients running on a computing device 104, 108, 112.

The web pages created by the server(s) 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computing devices 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
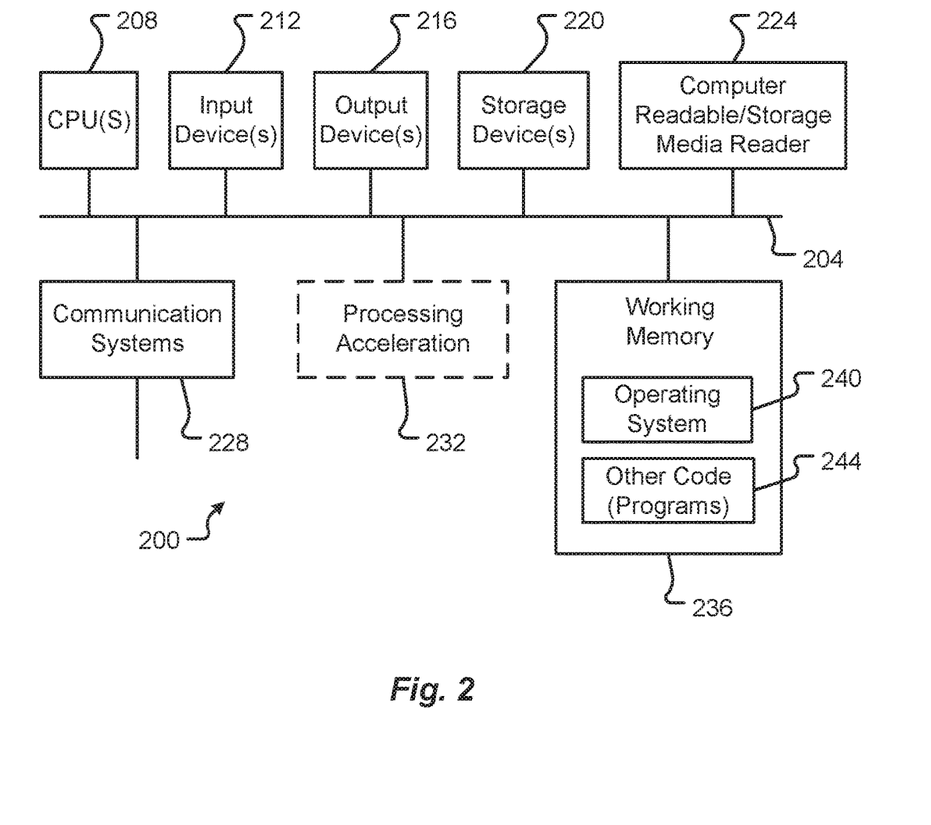
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices 104, 108, and 112, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read-only memory (ROM), random-access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
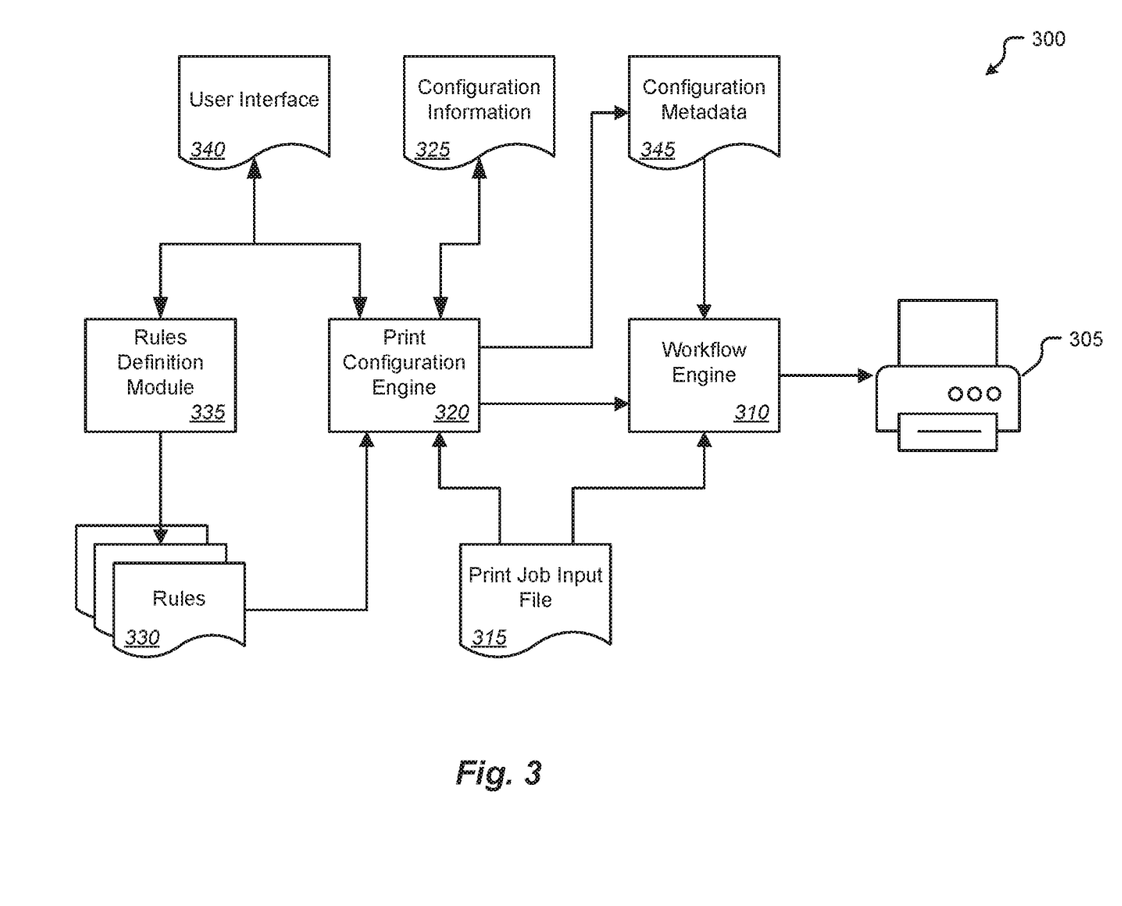
FIG. 3 is a block diagram illustrating elements of an exemplary print shop system in which embodiments of the present disclosure may be implemented.

FIG. 3 is a block diagram illustrating elements of an exemplary print shop system in which embodiments of the present disclosure may be implemented. As illustrated in this example, a print shop system 300 can comprise one or more printing devices 305 such as described above and a workflow engine 310. It should be noted that, while only one printing device 305 is shown here for the sake of simplicity, a typical print shop system 300 may include any number of printing devices 305 of different types. Generally speaking, the workflow engine 310 can receive a print job input file 315 containing text, graphics, and/or other content for a submitted print job and can, using this content, generate the document(s) to be printed and drive the printing device 305 to produce those document(s). The print shop system 300 can also include a print configuration engine 320. Generally speaking, the print configuration engine 320 can read the print job input file 315 and provide input to the workflow engine 315 for properly configuring and controlling the printing device 305. To do so, the print configuration engine 320 can read a set of configuration information 325 which defines and/or describes available configurations of the printing device 305 and a set of rules 330 defining the application of those configurations for various input objects of the print job input file 315.

The set of rules 330 can be defined by a rules definition module 335, for example, based on input received from a user through a user interface 340. The user interface 340 can comprise, for example, a set of one or more web pages or other textual and/or graphical displays or other renderings through which a user, such as an operator or supervisor of the print shop system 300, may interact with elements of the system 300. Through the user interface 340, the user may also read and/or define the configuration information 325. According to one embodiment, and as will described in greater detail below, the print configuration engine 320 can also generate and provide, e.g., through the user interface 340 one or more recommendations for configuring a specific print job based on the configuration information 325 and rules 330 as they apply to a given print job input file 315.

More specifically, one or more available print configurations for the print shop can be defined in the configuration information 325 based on input through the user interface 340. For example, one or more types of printing configurations available within the print shop can be defined. The types of print configurations can include, but are not limited to, color processing configurations, extended gamut color processing configurations, and/or spot process color processing configurations. A quality and cost associated with each type of printing configuration can also be defined. Similarly, the set of rules 330 can be defined by the rules definition module 335 based on input through the user interface 340. The rules 330 can comprise recommendation rules used by the print configuration engine 320 to generate recommendations for configuring a given print job. The recommendation rules 330 can further comprise content rules defining color processing options for different content objects or types of content objects within a received print job input file 315. Threshold values can also be defined in the rules 330 for each of one or more recommendation criteria within the recommendation rules 330. As will be described further below, the recommendation criteria can comprise one or more of content criteria related to the content rules, production criteria related to the recommendation rules, and/or other criteria. In some cases, an optional default or preferred print configuration can be identified or defined in the configuration information 325. If such a preferred print configuration is defined, it can be indicated in the one or more recommendations generated by the print configuration engine 320.

For example, a user can specify through the user interface 340 the available standard, extended gamut and spot process printing configurations to be defined in the configuration information 325. As known in the art, many printers use CMYK (Cyan, Magenta, Yellow, Key(black)) configuration as their standard configuration. However, there are printers that support alternate configurations (e.g. BMYK). As such, the user can define an arbitrary number of colorants in an arbitrary sequence. As used herein the term colorant refers to ink or toner that can be mixed to reproduce colors, e.g., cyan, magenta, yellow and black.

As also known in the art, extended gamut configurations include the standard configuration colorants in addition to additional process colorants. Extended gamut printing uses a fixed set of process colorants beyond CMYK. For example, the PANTONE extended gamut system uses CMYK plus orange, green, and violet. As will be used herein, common extended gamut process colorant abbreviations are: C=Cyan; M=Magenta; Y=Yellow; K=Black; B=Blue; G=Green; O=Orange; R=Red; and V=Violet. Lower case letters represent "light" variants of a colorant, e.g., b=Light Blue. According to one embodiment, the user may specify in the configuration information 325 multiple extended gamut configurations based on the available printing device(s) 305. For example, the print shop system 300 may have a 5-color press with configurations of CMYK+G, CMYK+O, CMYK+V, etc., a 6-color press with configurations of CMYK+cm, CMYK+OB, etc., and a 7-color press with configurations of CMYK+RGB, CMYK+OVG, etc.

Spot colors refer to inks that are mixed to reproduce a specific color such as, for example, PANTONE 195. Spot process printing uses spot color inks as a process color. Spot process printing may use some or all standard printing colorants such as, for example, CM+Pantone385. As known in the art, DeltaE refers to the difference or distance between two colors. Spot process configurations defined in the configuration information 325 may include some or all the standard configuration colorants in addition to additional spot color process colorants. According to one embodiment, the user can define in the configuration information 325 multiple spot process color configurations using specific spot colors, for example, CMYK+PANTONE315.

The user may alternatively specify in the configuration information 325 use of a printing configuration that is derived from the print job input file 315. This can include, for example, the standard colorants which may be omitted if the job file does not require them and/or the spot colors in the submitted job. The configuration information 325 can further include information to characterize the printing quality and the cost of producing the job for each printing configuration. For example, the configuration information 325 can include information indicating a target printer or print condition which can be used to group print configurations, ICC profiles which may include one or more of a generic profile for the specified printing configuration in the specified printer, a profile for a printing standard (e.g. GRACoL), and/or a stock or stock group profile for printing using specific stocks or stock groups on the specified printing configuration. According to one embodiment, the configuration information 325 can also include job pricing and/or job costing for each of the defined configurations. In such cases, the configuration information 325 may include, for example, attributes for a pricing engine (not shown here). Such a pricing engine may be implemented as part of the print shop system 300, e.g., separate from or as part of the print configuration engine 320, or it may be an external service.

The user can specify through the user interface 340 the rules 330 and threshold values used by those rules 330. For example, recommendation rules, i.e., rules used as the basis of generating the recommendations, can include and use recommendation thresholds determining recommended print configurations for a given job. Such recommendation thresholds can include, for example, content criteria related to the content of the print job input file 315. Content criteria can include, but is not limited to, percentage of spot colors that can be reproduced within a specified deltaE, area of the document that can be reproduced within a specified deltaE which may be for spot colors only or any content (e.g. images), maximum deltaE for reproducing any spot color, average or median deltaE for reproducing spot colors, an indication of whether specific spot colors can be reproduced within a specified deltaE, an indication of whether specific spot colors are present in the file, etc. The recommendation thresholds can also include production criteria related to pricing, production costs, etc. The recommendation rules may also include rules related to content which consider additional criteria for determining whether page objects are considered when calculating the above. The objects may be included or excluded, for example, based on dimensions, page location, type (e.g. text vs images), and/or other considerations.

According to one embodiment, the configuration information 325 may define or identify a preferred or default printing configuration. In this case the rules 330 and thresholds described above can be used to determine whether the print configuration engine 320 should propose alternate print configurations for a given job. Alternatively, the print configuration engine 320 may use the recommendation rules 330 and thresholds to find a preferred configuration and to determine whether alternate configurations should be presented to the user. In one example, the print configuration engine 320 may be configured to select the highest quality print option based on specified threshold criteria. Alternatively, the print configuration engine 320 may use priorities for print configurations and use the threshold criteria for selecting the preferred configuration.

For example, the system may be configured with priorities for different configurations so that, for example, CMYK printing is preferred vs CMYK+OVG printing if all spot colors can be reproduced using both print configurations. Alternatively, the system may have a table correlating deltaE differences and page coverage to production costs to ensure that recommendations for more costly print configurations only happen when there's a substantial reduction in deltaE and/or when reproduction is improved on a substantial portion of the document. In this case, the recommendation thresholds are also used to determine whether alternate configurations may be presented to the user.

Once the print configuration information 325 and recommendation rules 330 have been defined, the print shop system 300 is ready to process print jobs. Accordingly, a print job input file 315 can be received for a print job submitted to the print shop system 300. The received file 315 can be evaluated based on the one or more available print configurations defined in the configuration information 325 and the defined rules 330. Based on applying the defined content rules 330 to the file 315, one or more target objects for color conversion can be identified. The identified one or more target objects can be retrieved, e.g., from the print job input file 315 or from another location indicated by a link or other means in the print job input file 315, and one or more valid print configurations can be identified for each retrieved target object. Color conversion can be performed on each retrieved object using each valid print configuration. Results of performing the color conversions can then be evaluated by the print configuration engine 320 according to the rules and criteria. For example, evaluating results of performing the color conversion can comprise applying the one or more recommendation rules 330 using the defined threshold values described above. The one or more recommendations generated by the print configuration engine 320 can be based on evaluating the results of performing the color conversions.

For example, the rules may specify certain spot colors. However, the system 300 may need to do a color conversion to evaluate the results against content rules, e.g. related to deltaE. The print shop system may have multiple printing devices 305 which may or may not print to industry standards such as FOGRA51, for example. The print shop system 300 may also have multiple configurations for each printing device 305 and perhaps multiple configurations for media or media groups for each printing device 305. As such, the system 300 should ascertain the targets for color conversion to ensure accurate evaluation of threshold rules. The targets for color conversion can be retrieved from an order management system, a scheduling system, or elsewhere and the target color conversion may be performed generically, e.g. on any cutsheet printer, or specifically, e.g., for a specific printer. Alternatively, the print configuration engine 320 may evaluate order data to select color conversion targets.

Once a target for color conversion has been identified, the print configuration engine 320 can determine which print configurations are valid. For example, if the target is cutsheet printing, the print configuration engine 320 can consider all print configurations for all cutsheet printers to be in scope. In another example, if the target is Specifications for Web Offset Printing (SWOP), the print configuration engine 320 can consider all print configurations for all printers able to reproduce the SWOP standard print conditions to be in scope. In yet another example, if the target is a specific printer, the print configuration engine 320 can consider all print configurations for all printers to be in scope. The print configuration engine 320 can then perform color conversion against all selected print configurations. The output files and perhaps the order information, such as pricing and/or cost, can be evaluated using the rules 330 and threshold values to determine recommended print configurations.

Thus, one or more recommendations for configuring the submitted print job can be generated by the print configuration engine 320 based on the evaluating of the received print job input file 315 and the submitted print job can be processed according to one of the generated recommendations by the print shop workflow engine 310. For example, processing the submitted print job according to the generated one or more recommendations can begin with determining whether more than one recommendation has been generated. In response to determining more than one recommendation has been generated, the generated recommendations can be presented, e.g., through the user interface 340, one or more printed samples, etc. A selection of one or more of the presented recommendations can be received and the selected recommendation can be applied by print configuration engine 320 and the print shop workflow engine 310 to process the submitted print job. In response to determining only one recommendation has been generated the generated recommendation can be selected by default or upon confirmation, e.g., through the user interface 340, and the recommendation can be applied to process the submitted print job.

Thus, if the print configuration engine 320 determines that there's only one recommended print configuration then the order processes normally. However, if the print configuration engine 320 determines that there are multiple recommended print configurations then the print configuration engine 320 can present the options to the user. The information presented can include, for example, print configurations, e.g., CMYK vs CMYK+OVG, thumbnails showing expected output for each print configuration, pricing for each print option. For longer documents, the print configuration engine 320 may use a combination of selected threshold criteria to select a subset of pages to present to the user. For example, the print configuration engine 320 may show document pages with the highest area of improved reproduction. The print configuration engine 320 may also show the pages with the largest deltaE reduction.

According to one embodiment, print configuration can be extended with configuration metadata 345 to specify one or more print configurations within a single job. Such metadata 345 can be defined by the print configuration engine 320 based on selections received through the user interface 340. These selections allow the user to define or select some pages printed with print configuration and other pages printed with another. In this case, the system 300 can give the user the option to print every page in the most optimal manner or the user can specify which pages to print using certain configuration, e.g., premium printing configurations. While such premium printing can affect the total cost, users may be more willing to pay a premium for some pages vs others, e.g., if there was a section with photographs vs pages with charts). Then, when printing is performed, the workflow engine 310 can map the different configurations to different portions of the document based on the metadata 345.

Embodiments of the present disclosure can be implemented in different ways. For example, the print configuration engine 320 may be as a stand-alone application or as a web-to-print system. The presentation of the information can vary depending on the implementation. For example, a stand-alone application may present a report that can be sent to a customer. The report may be sent to the customer via an email with links to capture the customer response. Alternatively, the system may ask the customer to review their order online and then present the options there. A web-to-print system may allow the customer to select a printing configuration during the order acquisition process. For example, the customer may be presented with an alternate configuration as an option vs using the preferred configuration in an "upsell" scenario. Additionally, or alternatively, the customer may be presented with all configurations as "good", "better", "best" options. Once a decision about production is made, the order management process continues per the workflow of the print shop system 300.

Figure 4:
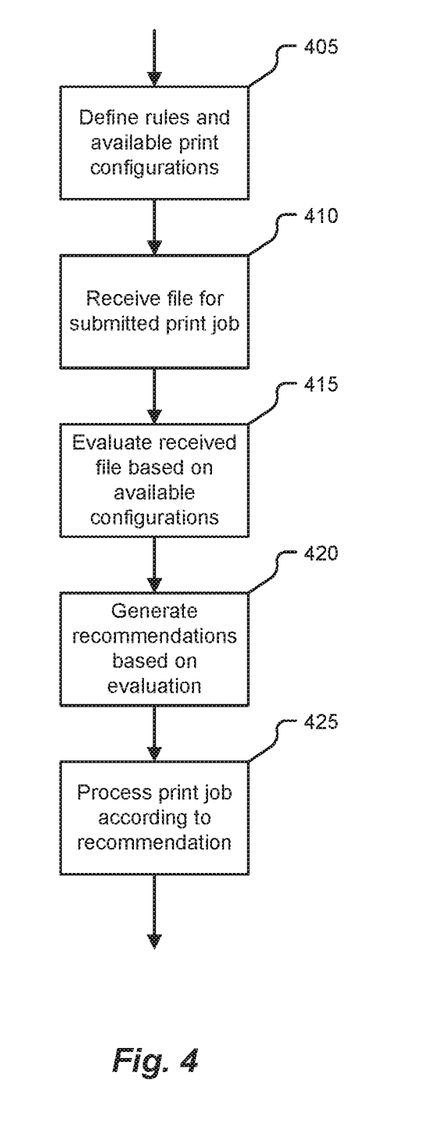
FIG. 4 is flowchart illustrating an exemplary process for configuring a print job in a print shop order workflow according to one embodiment of the present disclosure.

FIG. 4 is flowchart illustrating an exemplary process for configuring a print job in a print shop order workflow according to one embodiment of the present disclosure. At step 405, configuring a print job in a print shop workflow can begin with defining, by a print job processing system of the print shop, one or more available print configurations for the print shop and one or more recommendation rules for applying the available print configurations. Additional details of an exemplary process for defining print configurations and recommendation rules will be described below with reference to FIG. 5. At step 410, after the print configurations and recommendation rules have been defined, a file can be received for a print job submitted to the print shop. At step 415, the received file can be evaluated based on the defined one or more available print configurations and the defined one or more rules. Additional details of an exemplary process for evaluating the received file will be described below with reference to FIG. 6. At step 420, one or more recommendations for configuring the submitted print job can be generated based on the evaluating of the received file. At step 425, the submitted print job can be processed according to one of the generated recommendations and the print shop workflow. Additional details of an exemplary process for processing the print job will be described below with reference to FIG. 7.

Figure 5:
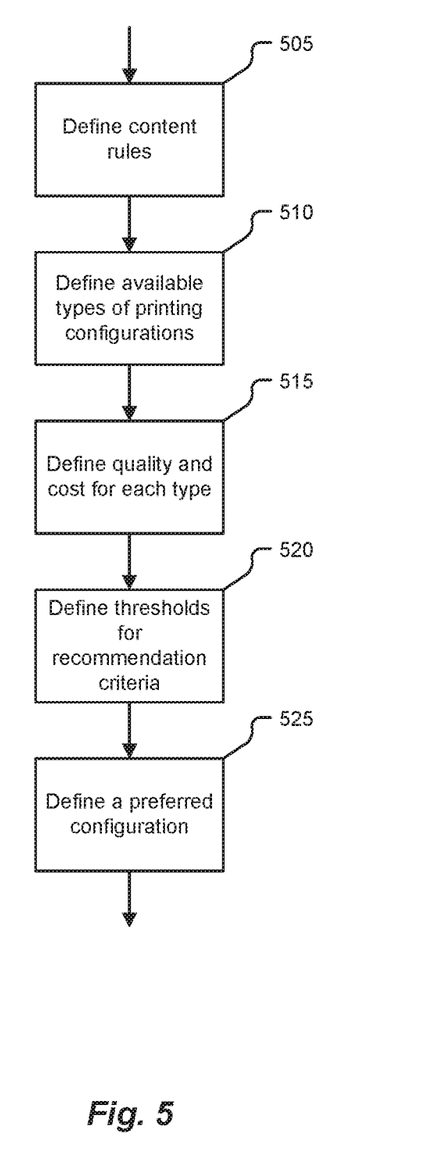
FIG. 5 is a flowchart illustrating an exemplary process for defining print configurations according to one embodiment of the present disclosure.

FIG. 5 is a flowchart illustrating an exemplary process for defining print configurations according to one embodiment of the present disclosure. At step 505, defining one or more available configurations and one or more rules can begin with defining one or more content rules within the recommendation rules. The content rules can define color processing options for content objects within the received file. At step 510, one or more types of printing configurations available within the print shop can be defined. For example, types of print configurations can comprise any one or more of various standard color processing configurations, one or more extended gamut color processing configurations, and/or one or more spot process color processing configurations as described in detail above. At step 515, a quality and cost associated with each type of printing configuration can be defined. At step 520, threshold values can be defined for each of one or more recommendation criteria within the recommendation rules. For example, the recommendation criteria can comprise one or more of content criteria related to the content rules, production criteria related to the recommendation rules, and/or other criteria as described in detail above. At step 525, in some cases, an optional preferred print configuration of the one or more available print configurations can be identified or defined. If such a preferred print configuration is defined, it can be indicated in the generated one or more recommendations.

Figure 6:
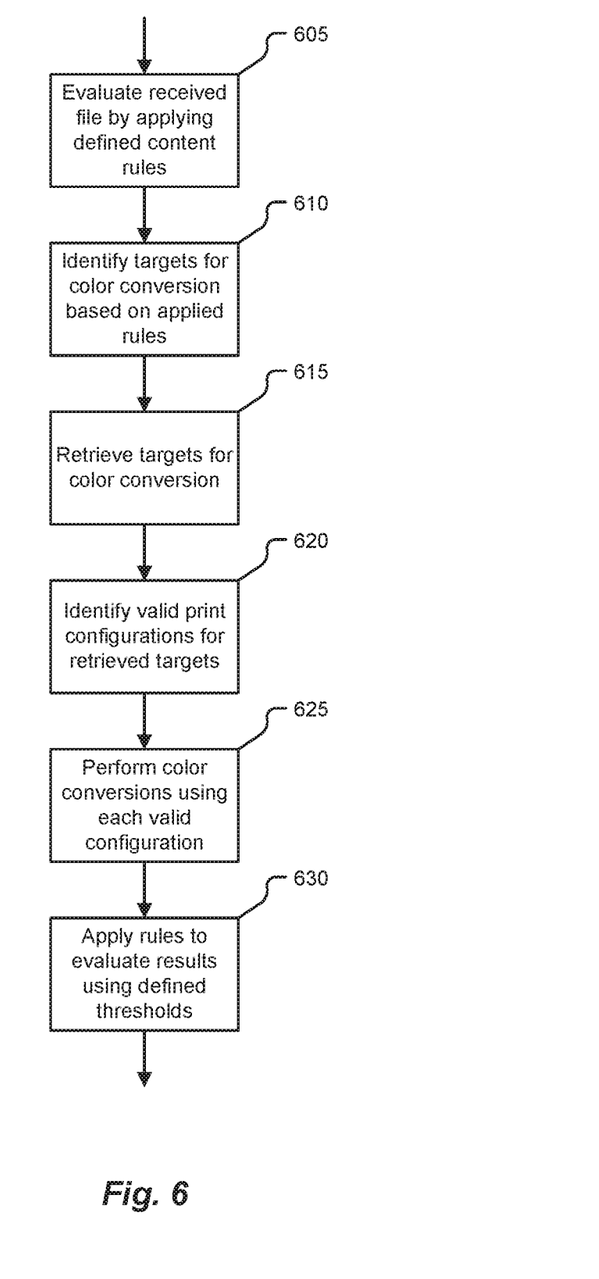
FIG. 6 is a flowchart illustrating an exemplary process for evaluating a print job according to one embodiment of the present disclosure.

FIG. 6 is a flowchart illustrating an exemplary process for evaluating a print job according to one embodiment of the present disclosure. At step 605, evaluating the received file can begin with applying the defined one or more content rules received file. At step 610, one or more target objects for color conversion can be identified based on applying the defined one or more content rules to the file. At step 615, the identified one or more target objects can be retrieved. At step 620, one or more valid print configurations can be identified for each retrieved target object. At step 625, color conversion can be performed on each retrieved object using each valid print configuration. At step 630, results of performing the color conversions can then be evaluated according to the rules and criteria as described in detail above. For example, evaluating results of performing the color conversion can comprise applying the one or more recommendation rules using the defined threshold values. The one or more recommendations generated can be based on evaluating the results of performing the color conversions.

Figure 7:
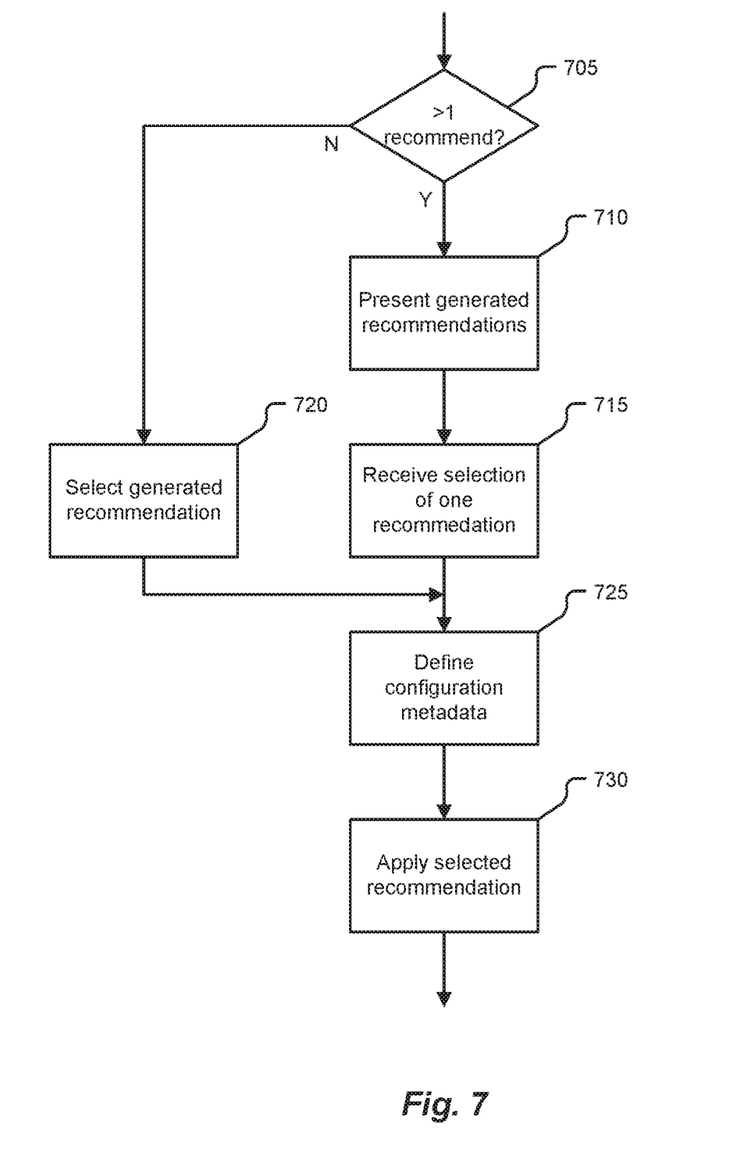
FIG. 7 is a flowchart illustrating an exemplary process for presenting recommendations for a print job configuration according to one embodiment of the present disclosure.

FIG. 7 is a flowchart illustrating an exemplary process for presenting recommendations for a print job configuration according to one embodiment of the present disclosure. At step 705, processing the submitted print job according to the generated one or more recommendations can begin with determining whether more than one recommendation has been generated. At step 710, in response to determining more than one recommendation has been generated, the generated recommendations can be presented, e.g., through a user interface, one or more printed samples, etc. At step 715, a selection of one or more of the presented recommendations can be received. At step 720, in response to determining only one recommendation has been generated the generated recommendation can be selected. At step 725, metadata 345 can be defined to specify one or more print configurations within a single job. As noted above, such metadata can be defined selections received from the user and can allow the user to define or select some pages printed with print configuration and other pages printed with another. At step 730, the selected recommendation and defined configuration metadata, if any, can be applied to the print shop workflow to process the submitted print job The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for configuring a print job in a print shop workflow, the method comprising:
    defining, by a print job processing system of the print shop, one or more available print configurations for the print shop and one or more recommendation rules for applying the available print configurations, wherein defining one or more available configurations and one or more rules comprises defining one or more content rules within the recommendation rules, the content rules defining color processing options for content objects, defining one or more types of printing configurations available within the print shop, defining for each type of printing configuration, a quality and/or cost associated with the type of printing configuration, and defining threshold values for each of one or more recommendation criteria defined within the recommendation rules;
    receiving, by the print job processing system, a file for a print job submitted to the print shop;
    evaluating, by the print job processing system, the received file based on the defined one or more available print configurations and the defined one or more rules;
    generating, by the print job processing system, one or more recommendations for configuring the submitted print job based on the evaluating of the received file; and
    processing, by the print job processing system, the submitted print job according to one of the generated recommendations and the print shop workflow.

2. The method of claim 1, wherein the content rules define color processing options for content objects based on one or more of percentage of spot colors that can be reproduced within a specified deltaE, an area of the document that can be reproduced within a specified deltaE, a maximum deltaE for reproducing a spot color, an average or median deltaE for reproducing spot colors, an indication of whether specific spot colors can be reproduced within a specified deltaE, and an indication of whether specific spot colors are present.

3. The method of claim 1, further comprising defining a preferred print configuration of the one or more available print configurations and wherein the preferred print configuration is indicated in the generated one or more recommendations.

4. The method of claim 1, wherein defining one or more types of print configurations comprises defining one or more standard color processing configurations, one or more extended gamut color processing configurations, or one or more spot process color processing configurations.

5. The method of claim 1, wherein the recommendation criteria comprise one or more of content criteria related to the content rules or production criteria related to the recommendation rules.

6. The method of claim 1, wherein evaluating the received file comprises:
    evaluating the received file using the defined one or more content rules;
    identifying, based on applying the defined one or more content rules, one or more target objects for color conversion;
    retrieving the identified one or more target objects;
    identifying one or more valid print configurations for each retrieved target object;
    performing color conversion on each retrieved object using each valid print configuration; and
    evaluating results of performing the color conversion.

7. The method of claim 6, wherein evaluating results of performing the color conversion comprises applying the one or more recommendation rules using the defined threshold values.

8. The method of claim 7, wherein generating the one or more recommendations is based on evaluating the results of performing the color conversion.

9. The method of claim 1, wherein processing the submitted print job according to the generated one or more recommendations comprises:
   determining whether more than one recommendation has been generated; and
   in response to determining more than one recommendation has been generated, presenting the generated recommendations, receiving a selection of one of the presented recommendations, and applying the selected recommendation to the print shop workflow.

10. The method of claim 9, wherein receiving a selection of one of the presented recommendations comprises receiving a selection of a portion of the print job to which the recommendation applies and defining metadata for the portion selected, and wherein applying the selected recommendation to the print shop workflow is further based on the metadata.

11. A system comprising:
   a processor; and
   a memory coupled with and readable by the processor and storing therein a set of instructions which, when executed by the processor, causes the processor to configure a print job in a print shop workflow by:
      defining one or more available print configurations for the print shop and one or more recommendation rules for applying the available print configurations, wherein defining one or more available configurations and one or more rules comprises defining one or more content rules within the recommendation rules, the content rules defining color processing options for content objects, defining one or more types of printing configurations available within the print shop, defining for each type of printing configuration, a quality and/or cost associated with the type of printing configuration, and defining threshold values for each of one or more recommendation criteria defined within the recommendation rules;
      receiving a file for a print job submitted to the print shop;
      evaluating the received file based on the defined one or more available print configurations and the defined one or more rules;
      generating one or more recommendations for configuring the submitted print job based on the evaluating of the received file; and
      processing the submitted print job according to one of the generated recommendations and the print shop workflow.

12. The system of claim 11, wherein defining one or more types of print configurations comprises defining one or more standard color processing configurations, one or more extended gamut color processing configurations, or one or more spot process color processing configurations and wherein the recommendation criteria comprise one or more of content criteria related to the content rules or production criteria related to the recommendation rules.

13. The system of claim 12, wherein evaluating the received file comprises:
   evaluating the received file using the defined one or more content rules;
   identifying, based on applying the defined one or more content rules, one or more target objects for color conversion;
   retrieving the identified one or more target objects;
   identifying one or more valid print configurations for each retrieved target object;
   performing color conversion on each retrieved object using each valid print configuration; and
   evaluating results of performing the color conversion, wherein evaluating results of performing the color conversion comprises applying the one or more recommendation rules using the defined threshold values and wherein generating the one or more recommendations is based on evaluating the results of performing the color conversion.

14. The system of claim 11, wherein processing the submitted print job according to the generated one or more recommendations comprises:
   determining whether more than one recommendation has been generated;
   in response to determining more than one recommendation has been generated, presenting the generated recommendations, receiving a selection of one or the presented recommendations, and applying the selected recommendation to the print shop workflow; and
   in response to determining only one recommendation has been generated, selecting and applying the generated recommendation to the print shop workflow.

15. A non-transitory, computer-readable medium comprising a set of instructions stored therein which, when executed by a processor, causes the processor to configure a print job in a print shop workflow by:
   defining one or more available print configurations for the print shop and one or more recommendation rules for applying the available print configurations, wherein defining one or more available configurations and one or more rules comprises defining one or more content rules within the recommendation rules, the content rules defining color processing options for content objects, defining one or more types of printing configurations available within the print shop, defining for each type of printing configuration, a quality and/or cost associated with the type of printing configuration, and defining threshold values for each of one or more recommendation criteria defined within the recommendation rules;
   receiving a file for a print job submitted to the print shop;
   evaluating the received file based on the defined one or more available print configurations and the defined one or more rules;
   generating one or more recommendations for configuring the submitted print job based on the evaluating of the received file; and
   processing the submitted print job according to one of the generated recommendations and the print shop workflow.

16. The non-transitory, computer-readable medium of claim 15, wherein defining one or more types of print configurations comprises defining one or more standard color processing configurations, one or more extended gamut color processing configurations, or one or more spot process color processing configurations, wherein the recommendation criteria comprise one or more of content criteria related to the content rules or production criteria related to the recommendation rules, and wherein evaluating the received file comprises:

evaluating the received file using the defined one or more content rules;

identifying, based on applying the defined one or more content rules, one or more target objects for color conversion;

retrieving the identified one or more target objects;

identifying one or more valid print configurations for each retrieved target object;

performing color conversion on each retrieved object using each valid print configuration; and evaluating results of performing the color conversion, wherein evaluating results of performing the color conversion comprises applying the one or more recommendation rules using the defined threshold values and wherein generating the one or more recommendations is based on evaluating the results of performing the color conversion.

17. The non-transitory, computer-readable medium of claim 15, wherein processing the submitted print job according to the generated one or more recommendations comprises:

determining whether more than one recommendation has been generated;

in response to determining more than one recommendation has been generated, presenting the generated recommendations, receiving a selection of one or the presented recommendations, and applying the selected recommendation to the print shop workflow; and in response to determining only one recommendation has been generated, selecting and applying the generated recommendation to the print shop workflow.

18. The system of claim 11, wherein the content rules define color processing options for content objects based on one or more of percentage of spot colors that can be reproduced within a specified deltaE, an area of the document that can be reproduced within a specified deltaE, a maximum deltaE for reproducing a spot color, an average or median deltaE for reproducing spot colors, an indication of whether specific spot colors can be reproduced within a specified deltaE, and an indication of whether specific spot colors are present.

19. The system of claim 11, wherein configuring the print job in the print shop workflow further comprises defining a preferred print configuration of the one or more available print configurations and wherein the preferred print configuration is indicated in the generated one or more recommendations.

20. The non-transitory, computer-readable medium of claim 15, wherein the content rules define color processing options for content objects based on one or more of percentage of spot colors that can be reproduced within a specified deltaE, an area of the document that can be reproduced within a specified deltaE, a maximum deltaE for reproducing a spot color, an average or median deltaE for reproducing spot colors, an indication of whether specific spot colors can be reproduced within a specified deltaE, and an indication of whether specific spot colors are present and wherein configuring the print job in the print shop workflow further comprises defining a preferred print configuration of the one or more available print configurations and wherein the preferred print configuration is indicated in the generated one or more recommendations.

* * * * *